US012742969B1

(12) United States Patent
Afek et al.

(10) Patent No.: US 12,742,969 B1
(45) Date of Patent: Sep. 22, 2026

(54) OPTICAL SYSTEMS HAVING OPTICAL COUPLERS FOR SENSING LIGHT

(71) Applicant: Apple Inc., Cupertino, CA (US)

(72) Inventors: Itai Afek, Kefar Sava (IL); Ariel Lipson, Tel Aviv (IL); Eran Tal, Petah Tikva (IL); Mark R Ayres, Boulder, CO (US); Ken Anderson, Longmont, CO (US); Maria I Campana, Boulder, CO (US); Daniel Ott, Boulder, CO (US); Sagee Rosen, Netzer Sereni (IL)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 18/349,498

(22) Filed: Jul. 10, 2023

Related U.S. Application Data

(60) Provisional application No. 63/392,689, filed on Jul. 27, 2022.

(51) Int. Cl.

| | |
|---|---|
| ***G02B 27/01*** | (2006.01) |
| ***G02B 6/26*** | (2006.01) |
| ***G02B 6/34*** | (2006.01) |

(52) U.S. Cl.
CPC ......... *G02B 27/0172* (2013.01); *G02B 6/262* (2013.01); *G02B 6/34* (2013.01); *G02B 2027/014* (2013.01)

(58) Field of Classification Search
CPC ...... G02B 27/0172; G02B 6/262; G02B 6/34; G02B 2027/014
See application file for complete search history.

(56) References Cited

U.S. PATENT DOCUMENTS

| | | | | |
|---|---|---|---|---|
| 5,003,625 | A * | 3/1991 | Khoe | G02F 2/002 398/205 |
| 9,507,093 | B2 * | 11/2016 | Popp | G02B 6/2706 |
| 10,175,489 | B1 * | 1/2019 | Robbins | H04N 3/08 |
| 10,877,281 | B2 * | 12/2020 | Robbins | G02B 27/283 |
| 11,106,033 | B2 | 8/2021 | Edwin et al. | |
| 11,199,710 | B2 * | 12/2021 | Wheelwright | G02B 27/286 |
| 11,474,358 | B2 | 10/2022 | Meitav et al. | |
| 11,953,787 | B2 * | 4/2024 | Abdulhalim | G02B 5/208 |
| 12,282,168 | B2 * | 4/2025 | Robinson | G02B 6/0055 |
| 12,442,966 | B2 * | 10/2025 | Bhakta | G02B 27/106 |
| 2003/0016425 | A1 * | 1/2003 | Tan | G02B 6/2706 398/204 |

(Continued)

*Primary Examiner* — Andrew Jordan
(74) *Attorney, Agent, or Firm* — Treyz Law Group, P.C.; Michael H. Lyons

(57) ABSTRACT

A display may include an emitter that emits infrared light and a coupler that couples the light into a waveguide and couples reflected infrared light coaxial with the light out of the waveguide. The optical coupler may include a polarizing beam splitter (PBS) mounted to a lateral surface of the waveguide. A linear polarizer may transmit the light to the PBS, which reflects the light towards a prism or a set of diffractive gratings that couple the light into the waveguide and that couple the reflected light out of the waveguide and towards the PBS. The PBS may transmit the reflected light towards a sensor for gaze tracking. The light and reflected light may be coupled through opposing surfaces of the waveguide if desired. These structures may serve to prevent reflected stray light from reaching the sensor and interfering with gaze tracking.

19 Claims, 8 Drawing Sheets

(56) References Cited

U.S. PATENT DOCUMENTS

2011/0268383 A1* 11/2011 Popp .................... G02B 6/3604 385/11
2019/0011705 A1* 1/2019 Robbins ............. G02B 27/0179
2019/0086674 A1 3/2019 Sinay et al.
2019/0171020 A1* 6/2019 Robbins ................. G06V 20/20
2020/0110268 A1* 4/2020 Robbins ............. G02B 27/0179
2021/0072542 A1* 3/2021 Wheelwright ....... G02B 27/283
2021/0349354 A1* 11/2021 Abdulhalim ........... G02B 27/30
2022/0011578 A1 1/2022 Sinay et al.
2022/0035161 A1 2/2022 Sinay et al.
2022/0099977 A1 3/2022 Meitav et al.
2023/0333302 A1* 10/2023 Bhakta ............... G02B 27/0172
2024/0036325 A1* 2/2024 Afek .................... G02B 17/006
2024/0061248 A1* 2/2024 Robinson ............... G02B 13/12
2025/0298248 A1* 9/2025 Wallin ............... G02B 27/0172
2025/0347915 A1* 11/2025 Robinson ............. G02B 27/288

* cited by examiner

OPTICAL SYSTEMS HAVING OPTICAL COUPLERS FOR SENSING LIGHT

This application claims the benefit of U.S. Provisional Patent Application No. 63/392,689, filed Jul. 27, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance. For example, stray light can increase background noise and limit contrast associated with sensing operations performed by the displays.

SUMMARY

An electronic device may have a display system for providing image light to an eye box. The display system may include a waveguide. A projector may generate image light. An input coupler may couple the image light into the waveguide. An output coupler may couple the image light out of the waveguide and towards the eye box.

The display system may include an optical emitter that emits infrared light. A first optical coupler may couple the infrared light into the waveguide. The waveguide may propagate the infrared light in a first direction via total internal reflection (TIR). A second optical coupler may couple the infrared light out of the waveguide and towards the eye box. The infrared light may reflect off an eye at the eye box as reflected light. The second optical coupler may couple the reflected light into the waveguide. The waveguide may propagate the reflected light in a second direction opposite the first direction via TIR. The reflected light may be coaxial with the light while propagating through the waveguide. The first optical coupler may couple the reflected light out of the waveguide and towards an optical sensor. The optical sensor may gather optical sensor data based on the reflected light and/or any other light such as visible light that follows the same path as the reflected light. One or more processors may perform gaze tracking based on the optical sensor data.

The optical coupler may include a polarizing beam splitter (PBS) mounted to a lateral surface of the waveguide. A linear polarizer may transmit the infrared light emitted by the optical emitter to the PBS. The PBS may reflect the infrared light towards a prism or a set of diffractive gratings that couple the infrared light into the waveguide. The prism or the set of diffractive gratings may couple the reflected light out of the waveguide and towards the PBS. The PBS may transmit the reflected light (e.g., with a linear polarization opposite the light reflected by the PBS) towards the optical sensor. If desired, the optical coupler may include a first linear polarizer and a first prism or set of diffractive gratings mounted to a first lateral surface of the waveguide for coupling the infrared light into the waveguide. The optical coupler may also include a second linear polarizer and a second prism or set of diffractive gratings mounted to a second lateral surface of the waveguide for coupling the reflected light out of the waveguide and towards the optical sensor. These structures may serve to prevent reflected stray light from reaching the optical sensor and interfering with imaging of the eye box.

DETAILED DESCRIPTION

Figure 1:
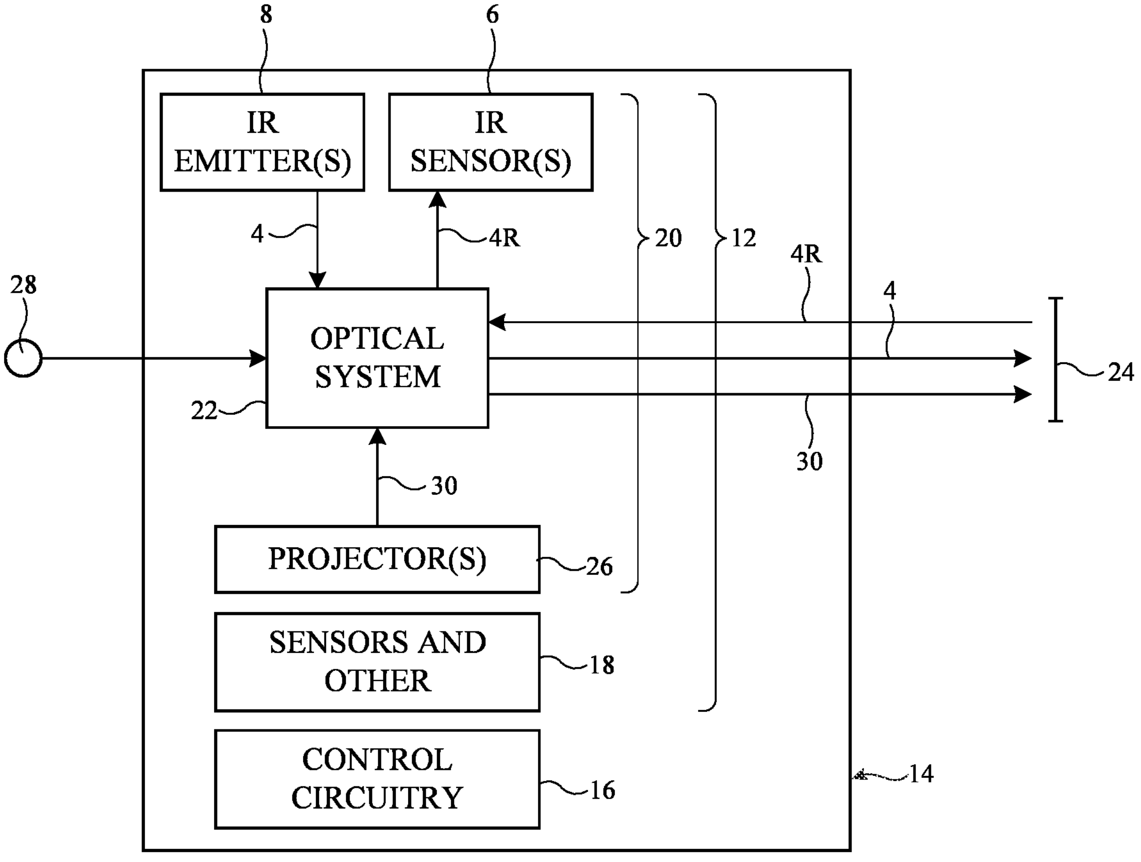
FIG. 1 is a diagram of an illustrative system having a display with a gaze tracking sensor in accordance with some embodiments.

System 10 of FIG. 1 may be an electronic device such as a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, visible light (e.g., including wavelengths from 400-700 nm) that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Control circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may include one or more processors (e.g., microprocessors, microcontrollers, digital signal processors, baseband processors, etc.), power management units, audio chips, graphics processing units, application specific integrated circuits, and other integrated circuits. Software code may be stored on storage in control circuitry 16 and run on processing circuitry in control circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world light (sometimes referred to as world light) from real-world (external) objects such as object 28 to be combined optically with virtual (computer-generated) images such as virtual images in image light 30. In this type of system, which is sometimes referred to as an augmented reality system, a user of system 10 may view both real-world content (e.g., world light from object 28) and computer-generated content that is overlaid on top of the real-world content. Camera-based augmented reality systems may also be used in device 10 (e.g., in an arrangement in which a camera captures real-world images of object 28 and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

If desired, system 10 may include an optical sensor. The optical sensor may be used to gather optical sensor data associated with a user's eyes at eye box 24. The optical sensor may, for example, be a gaze tracking sensor that gathers optical sensor data such as gaze image data (gaze tracking image data or gaze tracking sensor data) from a user's eye at eye box 24. Control circuitry 16 may process the optical sensor data to identify and track the direction of the user's gaze in real time. Control circuitry 16 may perform any desired operations based on the tracked direction of the user's gaze over time.

As shown in FIG. 1, the optical sensor (gaze tracking sensor) may include one or more optical emitters such as infrared emitter(s) 8 and one or more optical receivers (sensors) such as infrared sensor(s) 6 (sometimes referred to herein as optical sensor 6). Infrared emitter(s) 8 may include one or more light sources that emit sensing light such as light 4. Light 4 may be used for performing optical sensing on/at eye box 24 (e.g., gaze tracking) rather than conveying pixels of image data such as in image light 30. Light 4 may include infrared light. The infrared light may be at infrared (IR) wavelengths and/or near-infrared (NIR) wavelengths (e.g., any desired wavelengths from around 700 nm to around 1 mm). Light 4 may additionally or alternatively include wavelengths less than 700 nm if desired. Light 4 may sometimes be referred to herein as sensor light 4.

Infrared emitter(s) 8 may direct light 4 towards optical system 22. Optical system 22 may direct the light 4 emitted by infrared emitter(s) 8 towards eye box 24. Light 4 may reflect off portions (regions) of the user's eye at eye box 24 as reflected light 4R (sometimes referred to herein as reflected sensor light 4R, which is a reflected version of light 4). Optical system 22 may receive reflected light 4R and may direct reflected light 4R towards infrared sensor(s) 6. Infrared sensor(s) 6 may receive reflected light 4R from optical system 22 and may gather (e.g., generate, measure, sense, produce, etc.) optical sensor data in response to the received reflected light 4R. Infrared sensor(s) 6 may include an image sensor or camera (e.g., an infrared image sensor or camera), for example. Infrared sensor(s) 6 may include, for example, one or more image sensor pixels (e.g., arrays of image sensor pixels). The optical sensor data may include image sensor data (e.g., image data, infrared image data, one or more images, etc.). Infrared sensor(s) 6 may pass the optical sensor data to control circuitry 16 for further processing.

Figure 2:
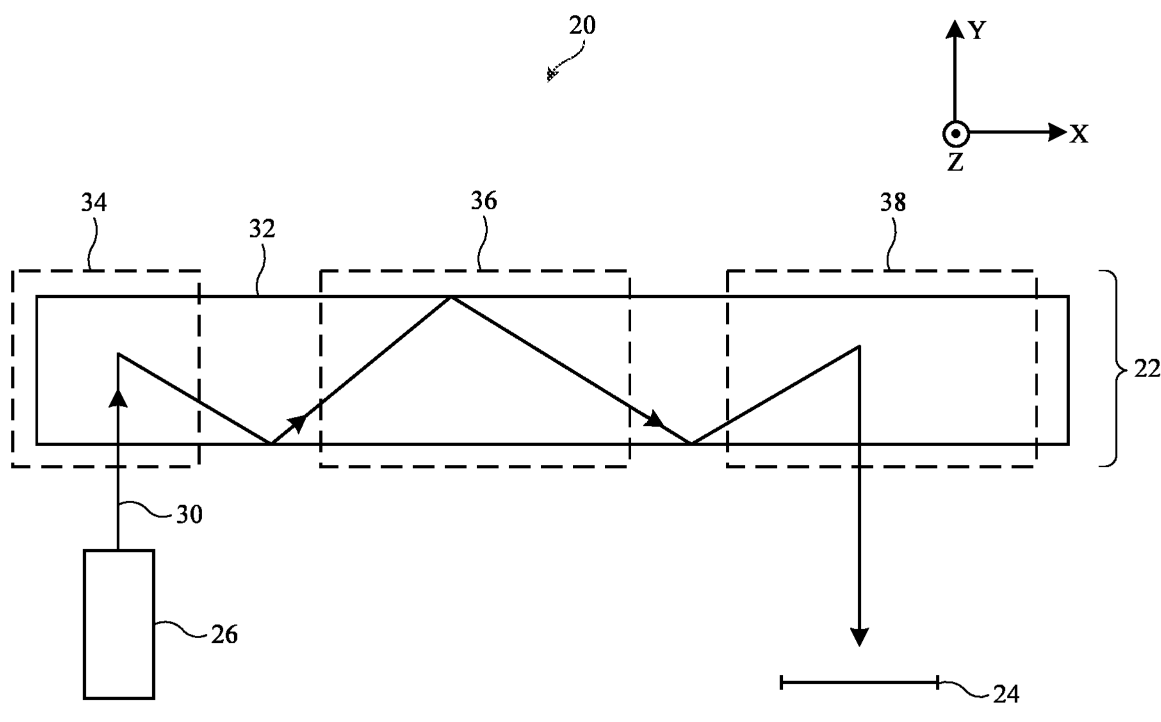
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38.

Figure 3:
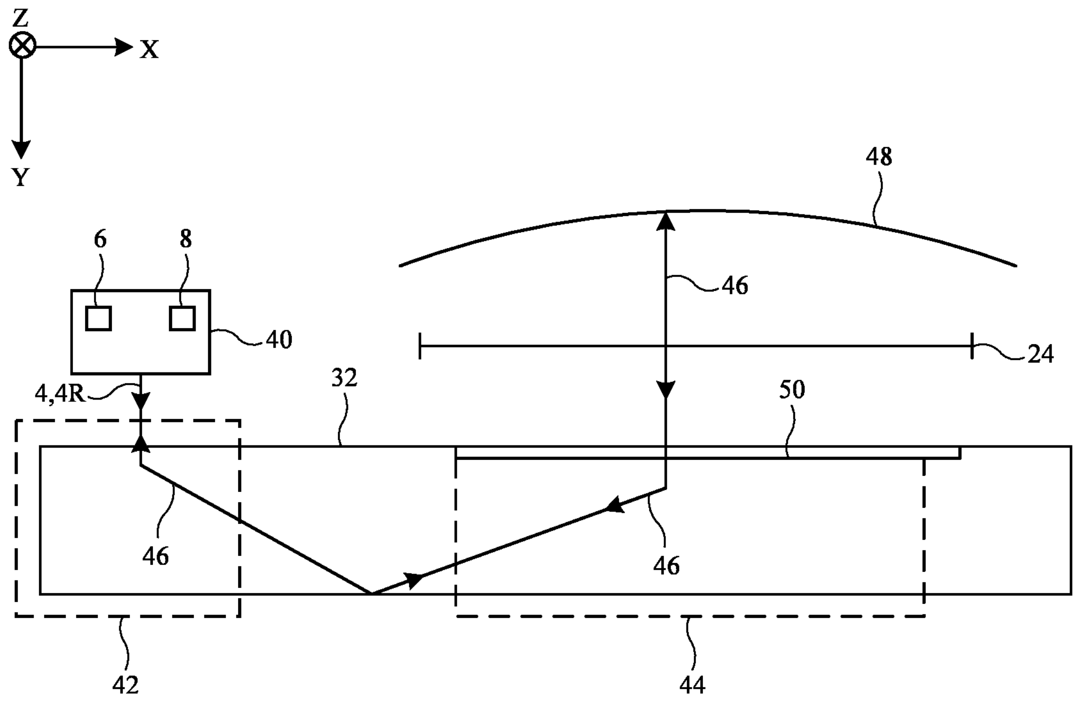
FIG. 3 is a top view of an illustrative optical system having a waveguide with an optical coupler that couples light into the waveguide and that couples reflected light out of the waveguide in accordance with some embodiments.

The operation of optical system 22 on image light 30 is shown in FIG. 2. Optical system 22 may also direct light 4 from infrared emitter(s) 8 towards eye box 24 and may direct reflected light 4R from eye box 24 towards infrared sensor(s) 6 (FIG. 1). FIG. 3 is a top view showing one example of how optical system 22 may direct light 4 from infrared emitter(s) 8 towards eye box 24 and may direct reflected light 4R from eye box 24 towards infrared sensor(s) 6 (FIG. 1). In the example of FIG. 3, image light 30 and the couplers that operate on image light 30 are not shown for the sake of clarity.

As shown in FIG. 3, infrared emitter(s) 8 and infrared sensor(s) 6 may be integrated or disposed in a gaze tracking sensor or system such as gaze tracking sensor 40 (sometimes referred to herein as optical sensor 40 or infrared sensor 40). Gaze tracking sensor 40 may also include optics such as one or more optical wedges, beam splitters, partial reflectors, polarizing beam splitters, prisms, lenses, etc. (not shown).

Infrared emitter(s) 8 may include one or more light sources that emit light 4. Infrared emitter(s) 8 may receive control signals (e.g., from control circuitry 16 of FIG. 1) that control how and when infrared emitter(s) 8 emit light 4. Gaze tracking sensor 40 may direct light 4 towards waveguide 32. Gaze tracking sensor 40 may also receive reflected light 4R from waveguide 32. The reflected light 4R received at gaze tracking sensor 40 may be co-axial (aligned) with the light 4 output by gaze tracking sensor 40 (e.g., light 4 may be emitted in the same direction with which reflected light 4R is received).

Optical system 22 may include at least a first optical coupler 42 and a second optical coupler 44 for use in performing optical sensing (gaze tracking) for gaze tracking sensor 40 (e.g., for redirecting light 4 and reflected light 4R). Optical couplers 42 and 44 may be disposed at, on, or within waveguide 32. Optical coupler 42 may also redirect image light 30 produced by projector 26 (e.g., optical coupler 42 may also form input coupler 34, cross-coupler 36, and/or output coupler 38 of FIG. 2) or may not redirect image light 30. Optical coupler 44 may also redirect image light 30 produced by projector 26 (e.g., optical coupler 44 may also form input coupler 34, cross-coupler 36, and/or output coupler 38 of FIG. 2) or may not redirect image light 30. Optical coupler 44 may, for example, at least partially (e.g., completely) overlap output coupler 38 (FIG. 2) and eye box 24 and may, if desired, be superimposed with output coupler 38 within the same volume of waveguide 32.

When a user is wearing or using system 10 (FIG. 1), the user's eye (retina) 48 may be located at, in, or overlapping eye box 24 (e.g., the user's eye 48 may be an object external to waveguide 32). During optical sensing at eye box 24 (e.g., gaze tracking), optical system 22 may direct light 4 into eye 48 to illuminate one or more regions on the user's eye (retina), as shown by arrow 46. Light 4 may reflect off of the one or more regions as reflected light 4R. Optical system 22 may direct reflected light 4R towards gaze tracking sensor 40, as shown by arrow 46. Light 4 and reflected light 4R may propagate along waveguide 32 via total internal reflection (TIR).

A single region of eye 48 is shown as being illuminated (e.g., by arrow 46) in the example of FIG. 3 for the sake of simplicity. In general, it may be desirable for gaze tracking sensor 40 to gather optical sensor data (images) of multiple different regions (areas or portions) of eye 48 while performing optical sensing (gaze tracking) at eye box 24. The different regions may, for example, correspond to different physiological features on the retina of eye 48. These physiological features may help control circuitry 16 (FIG. 1) to identify and track the gaze direction of eye 48 over time (e.g., by performing feature a detection operation on the physiological features to generate a vector oriented in the direction of the user's gaze at eye box 24).

Optical coupler 42 may form an input coupler for the light 4 emitted by gaze tracking sensor 40. Optical coupler 42 may therefore couple light 4 incident upon optical system 22 from incident angles outside the TIR range of waveguide 32 into waveguide 32 (e.g., at output angles within the TIR range of the waveguide). Optical coupler 42 may also form an output coupler for the reflected light 4R received by optical system 22 after reflection off eye 58. Optical coupler 42 may therefore couple reflected light 4R incident upon optical coupler 42 at incident angles within the TIR range of waveguide 32 (e.g., after propagating along waveguide 32 via TIR) out of waveguide 32 and towards gaze tracking sensor 40 (e.g., at output angles outside the TIR range of waveguide 32).

Optical coupler 44 may form an output coupler for the light 4 propagating along waveguide 32 via TIR. Optical coupler 44 may therefore couple light 4 incident upon optical coupler 44 from incident angles within the TIR range of waveguide 32 out of waveguide 32 and towards eye box 24 (e.g., at output angles outside the TIR range of the waveguide). Optical coupler 44 may also form an input coupler for the reflected light 4R received by optical system 22 after reflection off eye 58. Optical coupler 44 may therefore couple reflected light 4R incident upon optical coupler 65 at incident angles outside the TIR range of waveguide 32 into waveguide 32 (e.g., at output angles within the TIR range of waveguide 32). Optical coupler 44 may direct light 4 to multiple different regions of eye 48 and may receive reflected light 4R from those multiple different regions of eye 48 if desired.

Optical coupler 42 and optical coupler 44 may each include prisms, mirrors, partial reflectors (e.g., louvered mirrors), diffractive gratings such as volume holograms, surface relief gratings (SRGs), or meta-gratings, waveguide facets, lenses, and/or any other desired optical coupling structures. Optical coupler 44 may, for example, include multiple sets of diffractive gratings, where each set of diffractive gratings diffracts incident light 4 to a respective different region on eye 48 and diffracts incident reflected light 4R from a different respective region on eye 48 in one or more directions (e.g., within one or more fields of view) within waveguide 32 (e.g., towards optical coupler 42).

If desired, a phase retarder such as quarter waveplate (QWP) 50 may be disposed at, on, in, or overlapping waveguide 32. QWP 50 may at least partially (e.g., completely) overlap optical coupler 44. QWP 50 may, for example, be layered onto a lateral surface of waveguide 32 facing eye box 24. QWP 50 may transmit light 4 redirected (e.g., diffracted) by optical coupler 44 and may transmit reflected light 4R from eye 48 towards optical coupler 44. In implementations where light 4 is coupled into waveguide 32 with a first linear polarization, QWP may convert light 4 to circularly polarized (CP) light upon transmitting light 4. This configures QWP to receive circularly polarized reflected light 4R rather than with a second linear polarization orthogonal to the first linear polarization. QWP 50 may, for example, be disposed on waveguide 32 in implementations where it is preferred to pass the same polarization of light reflected from eye 48 (reflected light 4R) to infrared sensor(s) 6 rather than a polarization orthogonal to the polarization of the light 4 incident upon eye 48. This may be useful in cases where a large portion of light is specularly reflected rather than scattered from the retina. Specular reflections maintain polarization, unlike diffuse scattering which randomizes the polarization in the reflected light.

In the example of FIG. 3, gaze tracking sensor 40 is mounted at/facing the same side of waveguide 32 as eye box 24 (e.g., a user-facing side of the waveguide). This is merely illustrative and, if desired, one or both of infrared emitter(s) 8 and infrared sensor(s) 6 may be disposed on the side of waveguide 32 opposite eye box 24 (e.g., a world-facing side of the waveguide). In the example of FIG. 3, the light 4 directed towards the region(s) of eye 48 at eye box 24 is co-axial (aligned) with the reflected light 4R reflected off the region(s) of eye 48 (as shown by bi-directional arrow 46). Light 4 may be co-axial (aligned) with reflected light 4R while propagating through waveguide 32 via TIR. In other words, the photons of light 4 and the photons of reflected light 4R follow the same optical path(s) between the gaze tracking sensor and the eye (e.g., through waveguide 32 and optical system 22).

One challenge in implementing such a coaxial imaging system is the occurrence of stray light from light 4 and/or reflected light 4R reflecting or scatting off the various surfaces it passes through in optical coupler 42, waveguide 32, and/or gaze tracking sensor 40. If care is not taken, this stray light can overwhelm the desired retinal signal in the optical sensor data gathered by infrared sensor(s) 6 (e.g., limiting signal-to-noise ratio (SNR)). To minimize this stray light and maximize the desired retinal signal (e.g., the SNR), optical coupler 42 may couple light 4 into and may couple reflected light 4R out of waveguide 32 in orthogonal polarization states (e.g., gaze tracking sensor 40 and optical coupler 42 may utilize cross-polarization in performing sensing operations).

Figure 4:
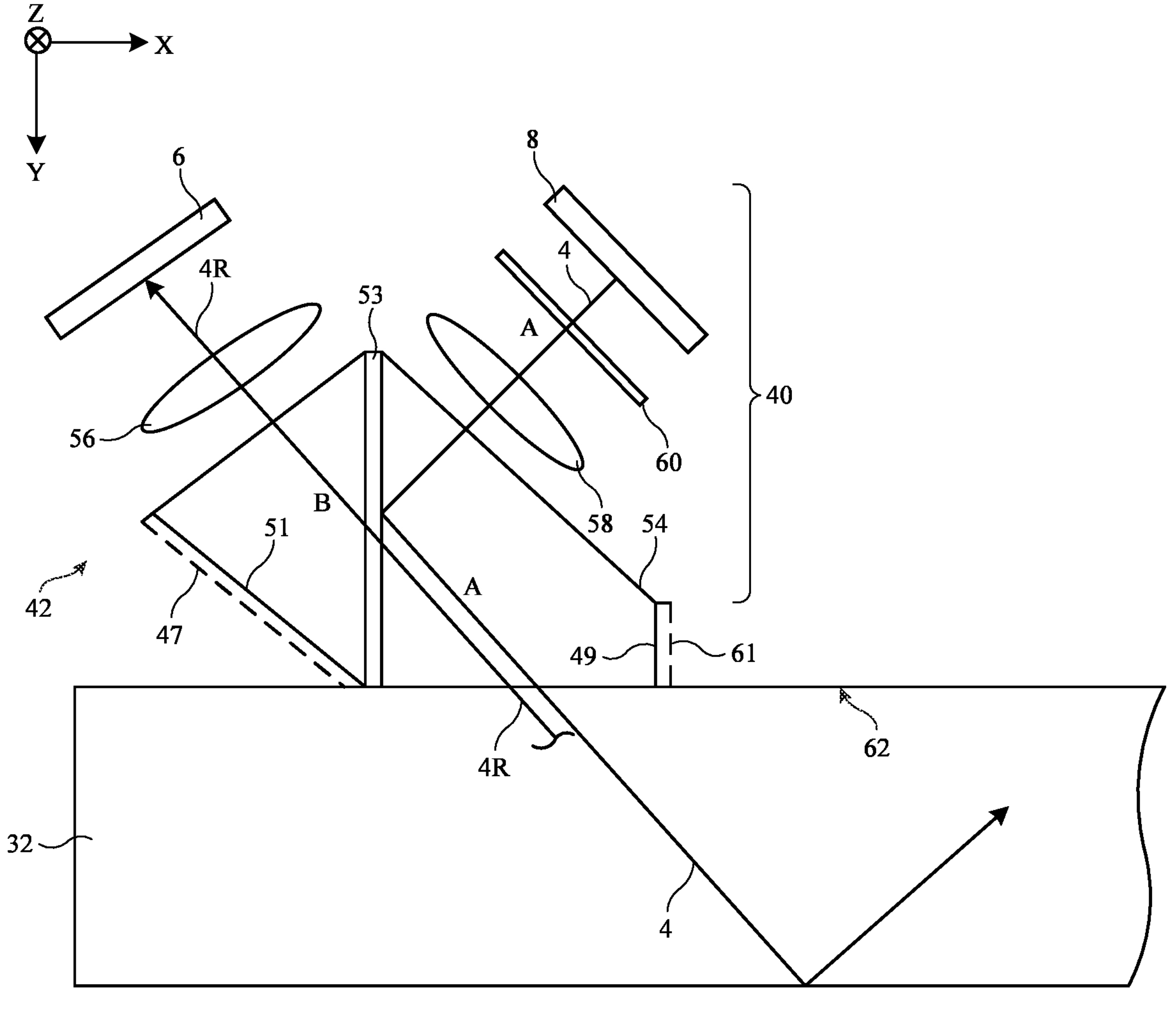
FIG. 4 is a top view of an illustrative optical coupler having a polarizing beam splitter between optical wedges for coupling light into a waveguide and for coupling reflected light out of the waveguide in accordance with some embodiments.

FIG. 4 is a diagram showing one example of how optical coupler 42 and gaze tracking sensor 40 may transmit light 4 and reflected light 4R in orthogonal polarization states. As shown in FIG. 4, optical coupler 42 may include optics such as at least a first prism (optical wedge) 54 and a second prism (optical wedge) 52. A first surface of prism 54 may be mounted to lateral surface 62 of waveguide 32. Prism 52 may have a first surface mounted to a second surface of prism 54 (e.g., a surface of prism 54 orthogonal to lateral surface 62 of waveguide 32). Prism 54 may have a third surface facing infrared emitter(s) 8 in gaze tracking sensor 40. Prism 52 may have a second surface facing infrared sensor(s) 6 in gaze tracking sensor 40.

Optical coupler 42 may include a polarizing beam splitter such as polarizing beam splitter (PBS) 53. PBS 53 may be interposed or sandwiched between prism 52 and prism 54. PBS 53 may, for example, be layered onto the second surface of prism 54 and/or the first surface of prism 52 (e.g., PBS 53 may extend orthogonal to lateral surface 62 of waveguide 32). PBS 53 may be configured to reflect light of a first polarization (e.g., a first linear polarization A) while (concurrently) transmitting light of a second polarization that is different from (e.g., orthogonal to) the first polarization (e.g., a second linear polarization B). In some implementations, PBS 53 may include a thin film polarizer. In other implementations, PBS 53 may include a wire grid polarizer (e.g., may be a wire grid PBS). Implementing PBS 53 as a wire grid PBS may allow the PBS to be applied to low index glasses such as bk7 and has a relatively wide acceptance angle range, for example.

Gaze tracking sensor 40 may include a collimating lens 58 optically coupled between prism 54 and infrared emitter(s) 8. Gaze tracking sensor 40 may include a collimating lens 56 optically coupled between prism 52 and infrared sensor(s) 6. Collimating lenses 56 and 58 may each include one or more lens elements. Gaze tracking sensor 40 may include a polarizer optically coupled between collimating lens 58 and infrared emitter(s) 8 such as linear polarizer (LP) 60. LP 60 may be spaced apart from infrared emitter(s) 8, may be layered onto a surface of collimating lens 58, and/or may be layered onto a surface of infrared emitter(s) 8.

Infrared emitter(s) 8 may include one or more light sources such as collimated vertical-cavity surface-emitting lasers (VCSEL), light-emitting diodes (LED), OLEDs, super-luminescent diode (SLD), and/or other light sources. If desired, the light sources may be arranged in one or more arrays. The light 4 emitted by infrared emitter(s) 8 may be unpolarized. The unpolarized light may pass through LP 60. LP 60 may transmit light 4 with a first polarization (e.g., a first linear polarization A) without transmitting other polarizations of light 4. Collimating lens 58 may direct light 4 with the first polarization towards PBS 53 through the third surface of prism 54. PBS 53 may reflect light 4 with the first polarization. Prism 54 may direct the light 4 reflected by PBS 53 into waveguide 32 through the first surface of prism 54 (e.g., at an output angle within the TIR range of waveguide 32).

Reflected light 4R may be incident upon optical coupler 42 from within waveguide 32 (e.g., coaxial with light 4). Reflected light 4R may pass through the first surface of prism 54 to PBS 53. PBS 53 may transmit reflected light 4R of a second polarization different from (e.g., orthogonal to) the first polarization of light 4 (e.g., with a second linear polarization B that is orthogonal to the first linear polarization A). At the same time, PBS 53 does not pass light of other polarizations. In this way, PBS 53 may effectively remove stray light that has reflected off one or more surfaces in optical system 22 from reaching infrared sensor(s) 6. In other words, PBS 53 may serve as a gate that only allows photons having linear polarization B to pass to infrared sensor(s) 6, thereby reducing stray light paths in the system.

Reflected light 4R may be reflected off eye 48 with second linear polarization B or may be mostly depolarized upon reflection (scattering) off eye 48. PBS 53 may transmit the portion of reflected light 4R having second linear polarization B without transmitting other polarizations of reflected light 4R. Prism 52 may direct reflected light 4R of the second polarization towards infrared sensor(s) 6. Reflected light 4R of the second polarization may pass through the second surface of prism 52 to collimating lens 56, which focuses reflected light 4R on the imaging surface of infrared sensor(s) 6. Infrared sensor(s) 6 may generate optical sensor data (e.g., images) based on the received reflected light 4R. In this way, optical coupler 42 may transmit both reflected light 4R and light 4 that is co-axial with reflected light 4R while minimizing stray light that reaches infrared sensor(s) 6 and thus background noise in the optical sensor data gathered by infrared sensor(s) 6 (e.g., maximizing the SNR of the optical sensor data).

Figure 5:
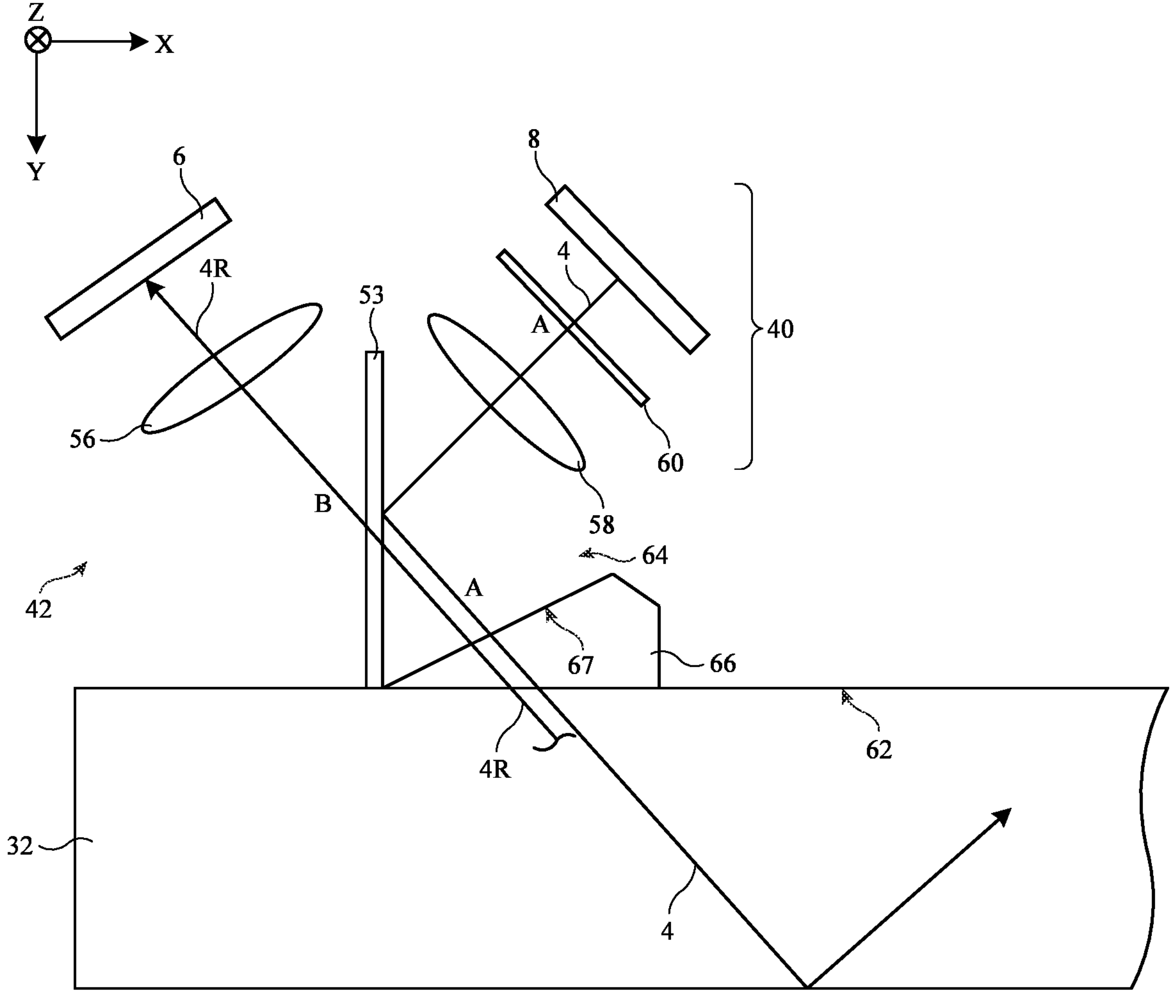
FIG. 5 is a top view of an illustrative optical coupler having a polarizing beam splitter plate and a prism for coupling light into a waveguide and for coupling reflected light out of the waveguide in accordance with some embodiments.

Prism 52 may have a third surface 51 extending from the first surface to the second surface of prism 52. Prism 54 may have a fourth surface 49 extending from the third surface of prism 54 to the first surface of prism 54. If desired, the angle of surface 51 and/or the angle of surface 49 (e.g., with respect to the waveguide) may be selected such that any light 4 that leaks through PBS 53 is specularly reflected (by surfaces 51 and/or 49) and redirected away from the acceptance aperture of infrared sensor(s) 6. If desired, the optical coupler may include neutral density (ND) filters such as a first ND filter 47 layered onto surface 51 of prism 52 and a second ND filter 61 layered onto surface 49 of prism 54. ND filter 47 may be index matched to prism 52. ND filter 61 may be index matched to prism 54. ND filters 47 and 61 may absorb most light, leaving any remaining light reflected from the underlying surfaces as primarily specular reflection. The example of FIG. 4 in which PBS 53 is sandwiched between prisms 52 and 54 is merely illustrative. If desired, PBS 53 may be formed from a standalone PBS plate without supporting prisms. FIG. 5 is a diagram showing one example of how PBS 53 may be formed from a PBS plate. As shown in FIG. 5, prisms 52 and 54 of FIG. 4 may be omitted. PBS 53 may be formed from a PBS plate (e.g., a plate of optical material having a wire grid PBS) that is mounted to lateral surface 62 of waveguide 32. The PBS plate may be oriented orthogonal to lateral surface 62.

If desired, optical coupler 42 may include a prism such as prism 66 mounted to lateral surface 62 of waveguide 32 to help redirect light 4 into waveguide 32 and to help redirect reflected light 4R out of waveguide 32. Prism 66 may have a surface 67 that is angularly separated from PBS 53 by gap 64 (e.g., an air gap). Prism 66 may receive the light 4 of the first polarization that reflects off PBS 53 through surface 67. Prism 66 may direct light 4 into waveguide 32 (e.g., at an output angle within the TIR range of waveguide 32). Conversely, prism 66 may receive reflected light 4R from within waveguide 32 and may transmit reflected light 4R towards PBS 53 (e.g., coaxial with the incident light 4). PBS 53 may transmit reflected light 4R of the second polarization towards infrared sensor(s) 6 while blocking or reflecting light of other polarizations.

Figure 6:
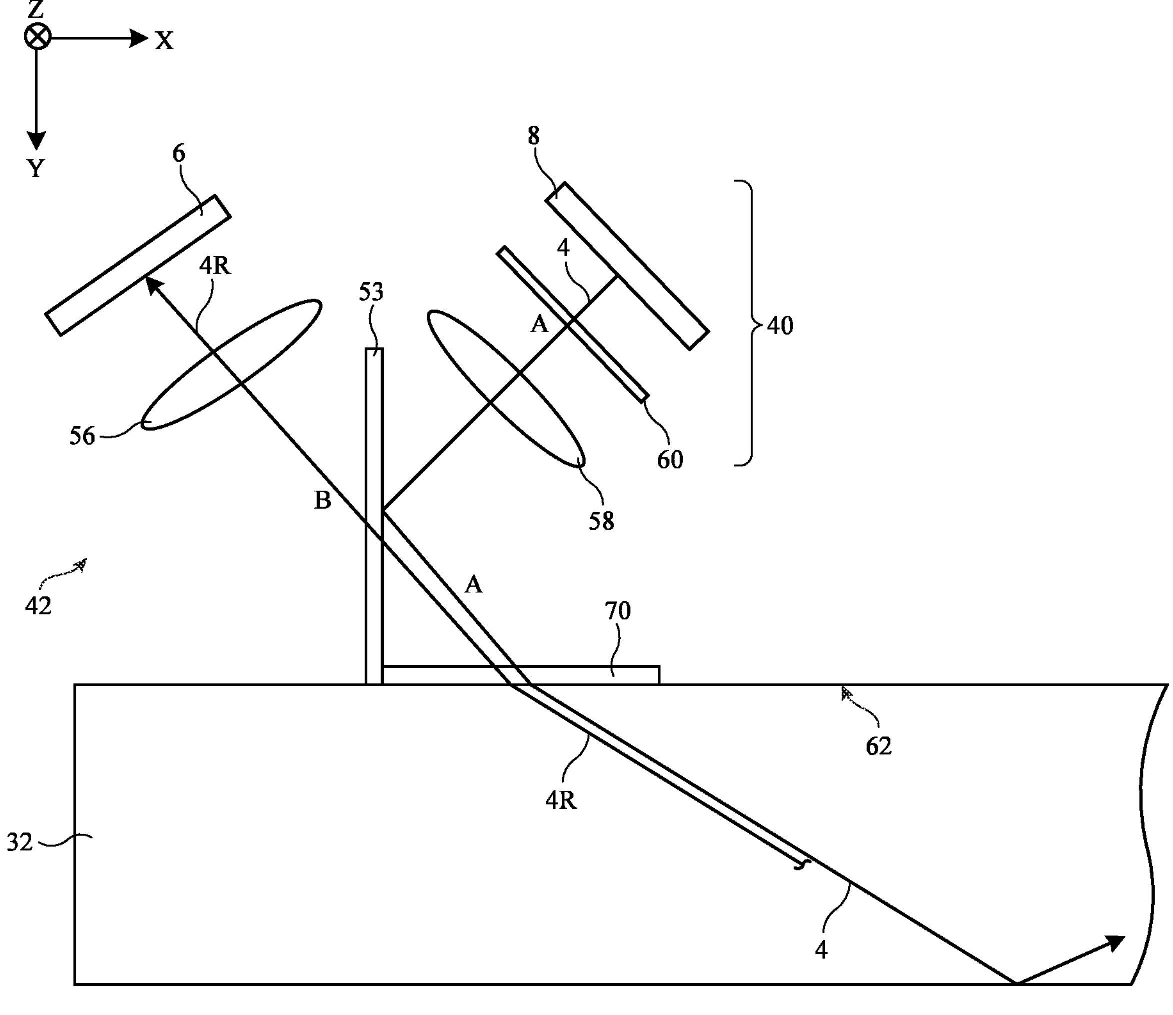
FIG. 6 is a top view of an illustrative optical coupler having a polarizing beam splitter plate and a set of diffractive gratings for coupling light into a waveguide and for coupling reflected light out of the waveguide in accordance with some embodiments.

The example of FIG. 5 in which optical coupler 42 includes prism 66 is merely illustrative. If desired, prism 66 may be replaced with a set of diffractive gratings. FIG. 6 is a diagram showing one example of how prism 66 may be replaced with a set of diffractive gratings. As shown in FIG. 6, prism 66 of FIG. 5 may be omitted and a set of diffractive gratings 70 may instead be layered or disposed on lateral surface 62 of waveguide 32. The set of diffractive gratings 70 may include one or more diffractive gratings. The set of diffractive gratings 70 may be recorded or etched into a layer of grating medium (e.g., holographic recording medium) layered on lateral surface 62 of waveguide 32. The one or more diffractive gratings may include a surface relief grating (SRG) or a set of volume holograms, as two examples.

The set of diffractive gratings 70 may redirect (diffract) light 4 into waveguide 32 (e.g., at an output angle within the TIR range of waveguide 32). Conversely, the set of diffractive gratings 70 may receive reflected light 4R from within waveguide 32 and may redirect (diffract) reflected light 4R towards PBS 53 (e.g., coaxial with the incident light 4). PBS 53 may transmit reflected light 4R of the second polarization towards infrared sensor(s) 6 while blocking or reflecting light of other polarizations.

The example of FIG. 6 in which the set of diffractive gratings 70 are layered onto lateral surface 62 without an overlying prism is merely illustrative. If desired, the set of diffractive gratings 70 may be sandwiched between prism 66 and lateral surface 62 of FIG. 5, may be embedded within waveguide 32 (e.g., in a layer of grating medium within waveguide 32 such as a layer of grating medium layered onto a waveguide substrate layer that has lateral surface 62), may be layered onto PBS 53, may be layered onto surface 67 of prism 66 of FIG. 5, may be sandwiched between prism 54 and lateral surface 62 of FIG. 4, may be sandwiched between PBS 53 and the second surface of prism 54 of FIG. 4, or may be disposed at other locations.

Figure 7:
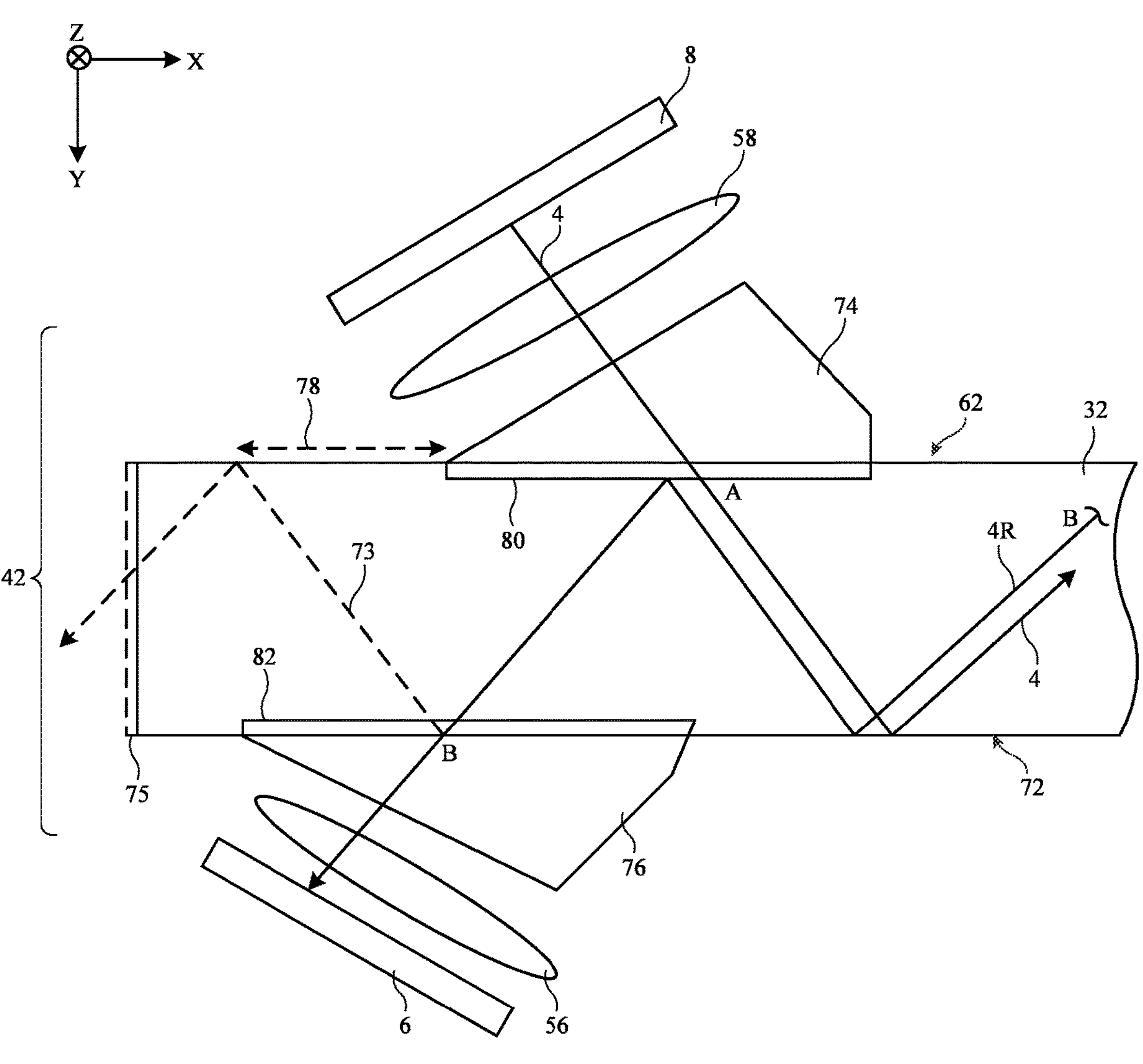
FIG. 7 is a top view of an illustrative optical coupler having a first linear polarizer overlapping for coupling light into a waveguide and having a second linear polarizer offset from the first linear polarizer for coupling reflected light out of the waveguide in accordance with some embodiments.

The examples of FIGS. 4-6 in which both light 4 and reflected light 4R are transmitted through the same lateral surface 62 of waveguide 32 are merely illustrative. If desired, light 4 and reflected light 4R may be transmitted through opposing lateral surfaces of waveguide 32. FIG. 7 is a diagram showing one example of how light 4 and reflected light 4R may be transmitted through opposing lateral surfaces of waveguide 32.

As shown in FIG. 7, optical coupler 42 may include a first prism (optical wedge) 74 and a second prism (optical wedge) 76. Waveguide 32 may have a lateral surface 72 opposite lateral surface 62. Prism 74 may have a first surface mounted to lateral surface 62. Prism 74 may have a second surface tilted at a non-parallel angle with respect to the first surface of prism 74. The second surface of prism 74 may face infrared emitter(s) 8 and collimating lens 58. Prism 76 may have a first surface mounted to lateral surface 72. Prism 76 may have a second surface tilted at a non-parallel angle with respect to the first surface of prism 76. The second surface of prism 76 may face infrared sensor(s) 6 and collimating lens 56 (e.g., infrared sensor(s) 6 and infrared emitter(s) 8 may be mounted facing opposing lateral surfaces of waveguide 32). Prism 74 may be at least partially non-overlapping with respect to prism 76 (e.g., when viewed in the +Y direction). For example, prism 74 may be laterally offset or separated from prism 76 by distance (offset) 78.

A first polarizer such as LP 80 may be disposed (e.g., sandwiched or layered) between the first surface of prism 74 and lateral surface 62 of waveguide 32. LP 80 may transmit light having a first polarization such as first linear polarization A without transmitting light of other polarizations. LP 80 may, for example, reflect light having a second polarization orthogonal to the first polarization such as a second linear polarization B orthogonal to first linear polarization A. A second polarizer such as LP 82 may be disposed (e.g., sandwiched or layered) between the first surface of prism 76 and lateral surface 72 of waveguide 32. LP 82 may transmit light having the second polarization (e.g., second linear polarization B) without transmitting light of other polarizations.

The unpolarized light 4 emitted by infrared emitter(s) 8 may pass through prism 74 to LP 80. LP 80 may transmit light 4 with the first polarization (e.g., first linear polarization A) without transmitting other polarizations of light 4. Prism 74 may direct light 4 with the first polarization into waveguide 32 through lateral surface 62 (e.g., at an output angle within the TIR range of waveguide 32).

Reflected light 4R may be incident upon optical coupler 42 from within waveguide 32 (e.g., coaxial/aligned with but in the opposite direction with which light 4 was transmitted into the waveguide by prism 74). Some or all of reflected light 4R may reflect off LP 80 (e.g., overlapping the location on lateral surface 62 that transmitted light 4 into waveguide 32). If desired, reflected light 4R may have the second polarization (e.g., second linear polarization B) after reflection off eye 48. In these implementations, all of reflected light 4R may reflect off LP 80 instead of transmitting through LP 80 because LP 80 only transmits light having the first polarization (e.g., first linear polarization A). In other implementations, reflected light 4R may have a mix of different polarizations (e.g., may be depolarized) after reflection off eye 48. In these implementations, the portion of reflected light 4R having the first linear polarization may be transmitted through LP 80 while the remainder of reflected light 4R having other linear polarizations may reflect off LP 80 towards prism 76. Offset 78 may be selected so that the reflected light 4R that reflects off LP 80 and is incident upon a location on lateral surface 72 that overlaps prism 76 and LP 82.

LP 82 may transmit reflected light 4R with the second polarization (e.g., second linear polarization B) without transmitting other polarizations of light 4. Prism 76 may direct reflected light 4R with the second polarization onto infrared sensor(s) 6 via collimating lens 56. In other implementations, LP 82 may be layered onto the surface of prism 76 that faces infrared sensor(s) 6 (e.g., prism 76 may be interposed between LP 82 and waveguide 32). In this way, LP 82 may eliminate stray light from reflections of reflected light 4R (e.g., portions of reflected light 4R having first linear polarization A that passed through LP 80 or other portions of reflected light 4R having any other polarizations that reflected off other surfaces in optical system 22) from the optical sensor data generated by infrared sensor(s) 6.

In this way, input coupling of light 4 and output coupling of reflected light 4R may occur in separate ports. Since there is no cube beam splitter, the working distance of infrared sensor(s) 6 and infrared emitter(s) 8 from waveguide 32 may be minimized, thereby reducing the overall volume of the system and potentially allowing for a larger FOV. If desired, the coupling aperture for infrared sensor(s) 6 may be slightly larger than the coupling aperture for infrared emitter(s) 8 in the unguided direction due to its slightly larger distance from the eye.

The example of FIG. 7 is merely illustrative. If desired, infrared sensor(s) 6, prism 74, and LP 82 may be disposed at lateral surface 62 whereas infrared emitter(s) 8, prism 74, and LP 80 are disposed at lateral surface 72. If desired, prism 76, infrared sensor(s) 6, and LP 82 as well as prism 74, infrared emitter(s) 8, and LP 80 may both be disposed at the same lateral surface of waveguide 32 (e.g., either lateral surface 62 or lateral surface 72 such that the camera and the illumination are both disposed on the same side of waveguide 32). If desired, prism 74 may be replaced with a first set of diffractive gratings and/or prism 76 may be replaced with a second set of diffractive gratings (e.g., the set of diffractive gratings 70 in FIG. 6). The first set of diffractive gratings may couple light 4 into waveguide 32 (e.g., without coupling reflected light 4R out of the waveguide). The second set of diffractive gratings may couple reflected light 4R out of waveguide 32. If desired, reflected light 4R may be coupled out of an edge facet of waveguide 32. In these implementations, reflected light 4R may continue to propagate along waveguide 32 via TIR until hitting the edge facet, as shown by arrow 73. Linear polarizer 82 may be disposed at or on the edge facet (e.g., at location 75) rather than on lateral surface 72 and prism 76 may be omitted in these implementations. The reflected light may be coupled out of the waveguide and towards the optical sensor through the edge facet and the linear polarizer 82 at location 75.

Figure 8:
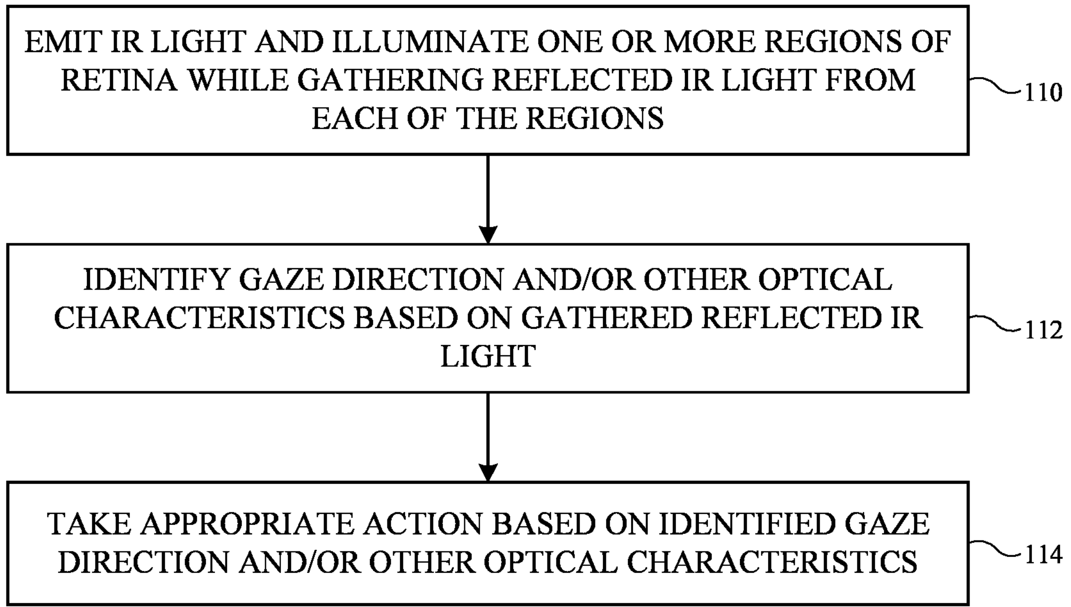
FIG. 8 is a flow chart of illustrative operations involved in performing optical sensing operations by illuminating different portions of an eye box in accordance with some embodiments.

FIG. 8 is a flow chart of illustrative operations involved in performing optical sensing at eye box 24 (e.g., gaze tracking) using gaze tracking sensor 40 and optical system 22.

At operation 110, infrared emitter(s) 8 may emit light 4. Optical system 22 and infrared emitter(s) 8 may illuminate one or more regions of eye 48 using the emitted light 4. Optical system 22 (e.g., optical couplers 42 and 44 of FIG. 3) may direct the reflected light 4R from the different regions of eye 48 towards infrared sensor(s) 6. Infrared sensor(s) 6 may generate optical sensor data (e.g., image data) in response to the received reflected light 4R.

At operation 112, control circuitry 16 may process the optical sensor data to identify (e.g., detect, generate, measure, sense, etc.) a gaze direction and/or other optical characteristics associated with eye 48 at eye box 24. Control circuitry 16 may, for example, detect different physiological features of eye box 24 associated with the N different regions 56 (e.g., using an object detection algorithm). Control circuitry 16 may identify the gaze direction and/or other optical characteristics associated with eye 48 based on the detected physiological features. If desired, control circuitry 16 may detect gaze by generating a gaze vector oriented in the direction of the eye's gaze. Control circuitry may track the direction of the user's gaze and/or the other optical characteristics over time.

At operation 114, control circuitry 16 may take any desired action based on the identified gaze direction and/or other optical characteristics. As one example, control circuitry 16 may adjust the image data used by projector(s) 26 (FIG. 1), may power system 10 on or off, may issue an alert, notification, or other output, may transmit information to an external server, and/or may perform any other desired operations based on the identified gaze direction and/or other optical characteristics.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A display comprising:

a waveguide;

an optical emitter configured to emit light;

a polarizing beam splitter (PBS) mounted to the waveguide;

a linear polarizer configured to transmit the light towards the PBS, wherein the PBS is configured to reflect the light into the waveguide, the waveguide is configured to propagate the light via total internal reflection (TIR) towards an object, the waveguide is configured to propagate reflected light from the object via TIR, and the reflected light is configured to be coupled out of the waveguide; and an optical sensor configured to receive, through the PBS, the reflected light coupled out of the waveguide.

2. The display of claim 1, wherein the waveguide has a lateral surface and the PBS is oriented orthogonal to the lateral surface.

3. The display of claim 2, further comprising:

a first prism mounted to the lateral surface; and a second prism, wherein the PBS is sandwiched between the first prism and the second prism, the second prism is configured to transmit the reflected light towards the optical sensor, the first prism is configured to transmit, into the waveguide, the light reflected off the PBS, and the first prism is configured to transmit, to the PBS, the reflected light coupled out of the waveguide.

4. The display of claim 2, wherein the PBS comprises a PBS plate.

5. The display of claim 4, further comprising:

a prism mounted to the lateral surface, wherein the prism has a surface that is angularly separated from the PBS plate by an air gap, the prism being configured to transmit, into the waveguide, the light reflected off the PBS and being configured to transmit, to the PBS plate, the reflected light coupled out of the waveguide.

6. The display of claim 4, further comprising:

a set of diffractive gratings layered on the lateral surface, wherein the set of diffractive gratings is configured to diffract, into the waveguide, the light reflected by the PBS, and is configured to diffract, towards the PBS plate, the reflected light.

7. The display of claim 6, wherein the set of diffractive gratings comprises a surface relief grating (SRG) or a set of volume holograms.

8. The display of claim 4, wherein the PBS plate comprises a wire grid polarizer.

9. The display of claim 1, wherein the PBS comprises a wire grid polarizer.

10. The display of claim 1, wherein the light comprises infrared light and the reflected light comprises reflected infrared light.

11. The display of claim 10, further comprising:

a projector configured to generate visible light containing an image, wherein the waveguide is configured to propagate the visible light via TIR;

a first optical coupler on the waveguide and configured to couple the visible light out of the waveguide and towards the object; and a second optical coupler on the waveguide and at least partially overlapping the first optical coupler, wherein the second optical coupler is configured to couple, out of the waveguide and towards the object, the infrared light, and wherein the second optical coupler is configured to couple, from the object and into the waveguide, the reflected infrared light.

12. The display of claim 11, further comprising:

a quarter waveplate on the waveguide and at least partially overlapping the second optical coupler.

13. A display comprising:

an optical emitter configured to emit first light;

a linear polarizer;

an optical sensor;

a waveguide; and an optical coupler on the waveguide, wherein the optical coupler comprises a polarizing beam splitter (PBS), the linear polarizer is optically coupled between the optical emitter and the PBS, the PBS is configured to reflect the first light, the optical coupler is configured to couple, into the waveguide, the first light reflected by the PBS, the optical coupler is configured to receive, from within the waveguide, second light that is co-axial with the first light, and the optical coupler is configured to couple, out of the waveguide and towards the optical sensor through the PBS, the second light.

14. The display of claim 13, wherein the second light comprises a reflected version of the first light.

15. The display of claim 14, wherein the first light and the second light comprise infrared light.

16. The display of claim 13, wherein the PBS is mounted to a lateral surface of the waveguide and the optical coupler comprises a prism mounted to the lateral surface of the waveguide, the prism being configured to transmit the first light and the second light.

17. The display of claim 13, wherein the PBS is mounted to a lateral surface of the waveguide and the optical coupler comprises a set of diffractive gratings layered on the lateral surface of the waveguide, the set of diffractive gratings being configured to diffract, into the waveguide, the first light reflected by the PBS, and the set of diffractive gratings being configured to diffract, towards the PBS, the second light.

18. A display comprising:

an optical emitter configured to emit first light;

an optical sensor;

a waveguide configured to propagate the first light in a first direction via total internal reflection (TIR) and configured to propagate, via TIR and in a second direction opposite the first direction, second light that is coaxial with the first light;

a first polarizer on the waveguide and configured to transmit light with a first polarization;

a first prism on the first linear polarizer and configured to transmit the first light into the waveguide through the first polarizer;

a second polarizer overlapping the waveguide and configured to transmit light with a second polarization different from the first polarization out of the waveguide and towards the optical sensor, wherein the first polarizer is offset from the second polarizer.

19. The display of claim 18, further comprising:

an optical coupler configured to couple the first light out of the waveguide and towards an object external to the waveguide, wherein the optical coupler is configured to couple the second light into the waveguide, and wherein the second light comprises a version of the first light that has reflected off the object.

* * * * *